United States Patent

Trattner et al.

[15] 3,639,161
[45] Feb. 1, 1972

[54] MELT-RESISTANT WELDING ELECTRODES

[72] Inventors: Hermann Trattner, Munich; Rudolf Klar, Augsburg, both of Germany

[73] Assignee: Siemens Aktiengesellschaft, Berlin and Munich, Germany

[22] Filed: Feb. 19, 1969

[21] Appl. No.: 800,767

[30] Foreign Application Priority Data

Feb. 23, 1968 Switzerland ..........................2687/68

[52] U.S. Cl..................................117/202, 117/203, 117/21, 219/145, 148/26
[51] Int. Cl..................................................B23k 35/34
[58] Field of Search..................219/119, 120, 145; 148/24, 148/26; 117/202, 203, 204, 205, 206, 207, 230

[56] References Cited

UNITED STATES PATENTS

| 1,267,400 | 5/1918 | Gravell | 219/119 |
| 2,540,811 | 2/1951 | Cobine | 219/145 |

*Primary Examiner*—William L. Jarvis
*Attorney*—Hill, Sherman, Meroni, Gross & Simpson

[57] ABSTRACT

A melt-resistant, reliably performing electrode for low-power electric arcs composed of a high-melting metallic substance, such as tungsten or thoriated-tungsten, having at least the welding tip thereof coated with a layer of high-melting metal-nonmetal compound, such as metal oxides, carbides or nitrides, i.e., thorium dioxide, hafnium carbide, tantalum nitride, etc. The process for producing such an electrode is also disclosed.

7 Claims, No Drawings

MELT-RESISTANT WELDING ELECTRODES

This invention relates to melt-resistant welding electrodes, and more particularly relates to melt-resistant electrodes composed of high-melting metallic materials for low-power electric arc welders and to a process of making such electrodes.

Present-day electric arc welding techniques under a protective gas generally utilize tungsten electrodes. It is known that in order to increase the emission strength of such electrodes and/or produce a stable electric arc, a small amount of another metal or metal oxide, such as thorium or thorium dioxide, is added, prior to sintering, during the production of tungsten electrodes. Conventional thoriated-tungsten electrodes contain up to about 2 percent thorium. When the amount of thorium is raised above 2 percent, a further gradual increase of the emission strength of the electrode occurs, but simultaneously a substantial increase in the brittleness of the electrode also takes place. Other metal and metal oxides have also been added to tungsten electrodes and include zirconium, rhenium and other high-melting metals and metal oxides. Additions of thorium are generally preferred since such a "doped" tungsten electrode has a relatively low tendency to evaporate and thereby allowing the ignition capacity of such an electrode to be preserved over a longer period of time.

Another known process for increasing electrode emission of hot-driven tungsten cathodes comprises of coating a thin layer of cesium or thorium onto the tungsten wires.

Attempts to adapt micromelt welding techniques to tungsten-protective gas welding and to plasma welding processes in an automated manufacturing system with conventional tungsten or thoriated-tungsten electrodes lead to difficulties. The micromelt process may be defined as a welding process for sheets of material having a thickness of less than 1.0 mm. and utilizing a welding current (for electric arc) of less than 12 amperes. The contact-free ignition necessary in such a welding process, initiated by a high-frequency sparkover, fails to attain a faultless (or reliable) ignition sequence.

Observations of such a micromelt welding process indicate that even thoriated-tungsten electrodes fail to provide reliable ignition sequences and that, on the average, after about 60 ignitions, such electrodes have substantially lost their ability to ignite. Further investigations indicated that the beginning of an ignition sequence, the ignition occurs at the very tip of the electrode. As a number of sequential ignitions increases, a larger and larger portion of the electrode surface is involved in the ignitions. After an average of about 60 ignitions (arrived at as a mean value from a very scattered broad range of ignitions), a back-firing took place in the burner sleeve or sock. Further ignitions became sporadic and it soon was impossible to achieve any ignitions. The original ignition ability of the thoriated-tungsten electrodes can be restored by grinding the tips thereof, however, this is also undesirable.

The severe lapse and unpredictability (or different behavior) of the ability of tungsten or thoriated-tungsten electrodes to reliably ignite over a number of ignitions, present extreme drawbacks to the use of tungsten-protective gas welding and/or plasma welding processes in a mechanized production of microwelded connections (as in microcircuits). In such an automated or mechanized process, it is essential to be able to achieve extremely reliable or faultless sequentially successive ignitions.

It has now been surprisingly discovered that the aforesaid disadvantages and drawbacks of conventional welding electrodes can be avoided in accordance with the principles of the invention by providing a coating on the surface, or at least on the actual welding tip, of such electrodes. The coating is composed of a high-melting metal-nonmetal compound or a high-melting mixture of several metal-nonmetal compounds that form a stable layer at electric arc temperatures and increase electron emission. Such coated electrodes exhibit a reliable ignition ability and provide a stable electric arc. Additionally, electrodes of the instant invention have an extremely long lasting stability. In accordance with the principles of the invention, the process for producing the electrodes comprises providing a suitable electrode and sintering a high-melting metal-nonmetal compound (including mixtures of such compounds) onto the surface (or at least the welding tip thereof) of the electrode.

By proper selections of the mixture of metal-nonmetal compounds having an extremely high-melting point and a metal-nonmetal compound having a substantially lower melting point, the sintering-on of a coating of such a mixture is more readily accomplished. Even relatively small admixtures of low-melting point and high-melting metal-nonmetal compounds is sufficient to materially lower the temperature required to sinter the coating onto the electrode surface.

To further demonstrate the principles of the invention, tungsten electrodes were coated with thorium dioxide (a metal-nonmetal compound) and sequentially successively ignited. The ignition conditions were substantially identical to those utilized in investigating conventional electrodes, which failed after about an average of 60 ignitions. The coated electrodes of the instant invention performed reliably over 8,000 sequential ignitions and showed no signs of deterioration of their ignition ability. Besides the long-lasting ignition ability, the coated electrodes of the invention are reliably ignitable with a customary or conventional current source of 0.5 amperes. Further, utilizing a current power of only 20 watts, and ignition plasma columns was maintained at a gap of up to 25 mm.

A procedure for producing coated electrodes of the invention from commercially available tungsten electrodes having a diameter of 0.5 to 1 mm. will be described in detail to further illustrate additional details of the invention. The coating material utilized during the demonstration was thorium dioxide, although other metal-nonmetal compounds could similarly be utilized. The tip of a conventional tungsten (or thoriated-tungsten) electrode was coated with a thin layer of a suitable adhesive and then dipped into pulverized thorium dioxide. The adhesive causes a sufficient amount of powdered thorium dioxide to adhere and to remain on the electrode tip. The electrode was then placed in the induction coil of a high-frequency generator and slowly heated until a color changeover occurred in the originally white thorium dioxide coating. The coated electrode was then subjected to further heating under a protective gas blanket until a melting of the thorium dioxide occurs. The coated electrode was then cooled and clamped into a burner. The electrode was spaced about 0.3 mm. from the burner electrode and a current strength of 5 amperes was applied thereto. In order to bake-in or burn-in the coating, the electrode spacing was increased to about 3 mm. with a simultaneous increase in current strength to about 15 amperes (which is substantially above the working range of the electrodes). The burning-in procedure was allowed to continue for about half a minute and then discontinued as the thorium dioxide coating is then sufficiently sintered on (or burned-in) to the surface of the electrode tip.

Of course, other high-melting metal-nonmetal compounds and mixtures thereof forming stable layers at electric arc temperatures and increasing electron emission may also be utilized. Examples of such other high-melting metal-nonmetal compounds include, hafnium carbide, tantalum carbide, tantalum nitride, mixtures of these, etc. In addition, as indicated hereinbefore, thorium dioxide may also be utilized. Thus, the high-melting metal-nonmetal compounds are predominantly high-melting metal oxides, carbides, nitrides and mixtures thereof. In certain application it may be desirable to coat the entire surface of the electrode with a high-melting metal-nonmetal compound, such as a metal oxide, carbide, nitride or mixtures of such compounds, while in other applications it is sufficient to merely coat the welding or working tip of an electrode.

In summation, it will be seen that the invention provides welding electrodes having a highly reliable ignition ability making them extremely useful in micromelt welding processes in accordance with the tungsten-protective gas and plasma welding techniques for automated manufacturing operations.

The electrodes (composed of high-melting metallic materials, having melting characteristics of a melt-resistant or nonconsumable welding electrode such as tungsten, or a doped tungsten welding electrode wherein the doping material is selected from thorium, thorium dioxide, zirconium, zirconium dioxide, rhenium, rhenium dioxide and other similarly high-melting metals and metal oxides) are coated, at least on their tips, with a stable layer of a high-melting metal-nonmetal compound such as metal oxides, carbides, nitrides, or mixtures thereof. The coated electrodes of the instant invention are extremely suitable for igniting and operating low-power electric arcs, as for example in gas discharge tubes. The process of producing such electrodes is relatively simple and consists of sintering the high-melting metal-nonmetal compound onto the appropriate surface of an electrode.

It will be understood that modifications and variations may be effected without departing from the spirit and scope of the novel concepts of the invention.

We claim as our invention:

1. A process for producing a melt-resisting welding electrode comprising (1) providing an electrode having a welding tip composed of a high-melting metallic material having melting characteristics of a melt-resistant welding electrode, and (2) sintering a layer of a high-melting metal-nonmetal compound onto the tip of said electrode.

2. The process as defined in claim 1, wherein the high-melting metal-nonmetal compound is selected from the group consisting essentially of a metal oxide, a metal carbide, a metal nitride and mixtures thereof.

3. The process as defined in claim 1, wherein the high-melting metal-nonmetal compound is selected from the group consisting essentially of thorium dioxide, hafnium carbide, tantalum nitride and mixtures thereof.

4. The process as defined in claim 1, wherein the high-melting metal-nonmetal compound is thorium dioxide.

5. A process for producing a melt-resistant welding electrode comprising (1) providing an electrode composed of a high-melting metallic material selected from the group consisting essentially of tungsten and throiated-tungsten, said electrode having a welding tip, (2) coating at least said welding tip with an adhesive, (3) applying pulverized thorium dioxide to the adhesive-coated tip, (4) slowly heating the electrode until the coated thorium dioxide powder melts, and (5) discontinuing the heating.

6. The process as defined in claim 5, wherein step (4) consists of (a) igniting the electrode at a low-current strength and at relatively close electrode spacing and (b) maintaining said ignition while increasing said electrode spacing and simultaneously increasing the current strength above the working range of the electrode to sinter the thorium dioxide onto the welding tip of said electrode.

7. The process as defined in claim 5, wherein step (4) occurs in a protective gas current.

* * * * *